(12) United States Patent
Dhaka (10) Patent No.: US 12,477,358 B2
(45) Date of Patent: Nov. 18, 2025

(54) VISUALIZING INTERFERENCE LEVEL IN WIRELESS NETWORK

(71) Applicant: Rakuten Symphony, Inc., Tokyo (JP)

(72) Inventor: Prithvi Raj Dhaka, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/016,706

(22) PCT Filed: Dec. 22, 2022

(86) PCT No.: PCT/US2022/053792
§ 371 (c)(1),
(2) Date: Jan. 18, 2023

(87) PCT Pub. No.: WO2024/102147
PCT Pub. Date: May 16, 2024

(65) Prior Publication Data
US 2025/0097727 A1 Mar. 20, 2025

(30) Foreign Application Priority Data
Nov. 8, 2022 (IN) .............................. 202221063674

(51) Int. Cl.
*H04W 24/02* (2009.01)
*G06T 11/20* (2006.01)
*H04W 64/00* (2009.01)

(52) U.S. Cl.
CPC ........... *H04W 24/02* (2013.01); *G06T 11/203* (2013.01); *H04W 64/006* (2013.01)

(58) Field of Classification Search
CPC ............... H04W 24/02; H04W 64/006; H04W 28/0226; H04W 4/02; H04W 16/18;
(Continued)

(56) References Cited

U.S. PATENT DOCUMENTS 10,129,768 B1 * 11/2018 Azem .................. H04W 24/02
2012/0315935 A1 * 12/2012 Wang Helmersson ......................
H04W 28/04
455/524

(Continued)

OTHER PUBLICATIONS

Written Opinion of the International Searching Authority dated Apr. 24, 2023 in Application No. PCT/US 22/53792.

(Continued)

*Primary Examiner* — Nimesh Patel
(74) *Attorney, Agent, or Firm* — Sughrue Mion, PLLC (57) ABSTRACT

Present disclosure provides visualizing interference level in a wireless network. The method includes receiving a plurality of KPIs from each UE (101) in the wireless network and geo-location information of each UE of plurality of UEs (101). The method includes determining interference level in plurality of geographic areas based on plurality of KPIs received from each UE of plurality of UEs (101) and geo-location information of each UE of plurality of UEs (101). The plurality of polygons are created based on interference level in plurality of geographic areas based on plurality of KPIs received from UE of plurality of UEs (101), and geo-location information of each UE of plurality of UEs (101). Further, plurality of polygons are stored for visualization on a geographical map.

16 Claims, 6 Drawing Sheets

(58) Field of Classification Search
CPC ....... H04W 4/027; H04W 4/40; H04W 24/10; H04W 24/04; H04W 52/225; H04W 16/22; H04W 16/32; H04W 48/04; H04W 52/244; H04W 72/0453; H04W 72/541; H04W 4/021; H04W 16/14; H04W 4/029; H04W 4/023; H04W 4/33; H04W 4/80; H04W 24/08; H04W 4/50; H04W 4/60; H04W 4/90; H04W 84/18; H04W 16/28; H04W 28/0236; H04W 28/0268; H04W 28/0967; H04W 52/0216; H04W 52/0229; H04W 52/0245; H04W 52/0258; H04W 52/0267; H04W 52/0274; H04W 52/0277; H04W 72/54; H04W 84/12; H04W 12/63; H04W 12/65; H04W 60/04; H04W 4/00; H04W 64/00; H04W 8/24; H04W 72/812; H04W 4/025; H04W 36/00838; H04W 84/005; H04W 88/06; H04W 28/0284; H04W 36/144; H04W 92/02; H04W 28/0205; H04W 28/0231; H04W 28/18; H04W 52/243; G01S 17/89; G01S 7/4817; G01S 17/34; G01S 17/58; G01S 17/931; G01S 17/48; G01S 17/86; H04J 11/0023; H04J 3/00; H04J 3/1694; H04J 11/0056; H04J 11/0059; H04J 11/0079; H04L 43/08; H04L 5/0035; H04L 67/75; H04L 69/329; H04L 9/40; H04L 41/16; H04L 41/22; H04L 43/045; H04L 43/065; H04L 43/0876; H04L 41/12; H04L 41/5009; H04L 5/0007; H04L 1/0041; H04L 1/1614; H04L 1/1671; H04L 1/1685; H04L 1/1854; H04L 41/0233; H04L 51/10; H04L 67/12; H04L 41/34; H04L 65/80; H04L 27/261; H04L 1/0026; H04L 41/147; H04L 41/5067; H04L 12/145; H04L 12/2854; H04L 43/0888; H04L 43/0852; H04L 43/0882; H04L 43/0811; H04L 43/02; H04L 43/55; H04L 45/08; H04L 5/0057; H04L 5/006; H04L 5/0064; H04L 67/61; H04B 17/23; H04B 17/345; H04B 17/391; H04B 7/0408; H04B 7/0805; H04B 7/06; H04B 7/0617; H04B 7/0626; H04B 7/0695; H04B 17/24; H04B 17/318; H04B 7/0452; H04B 17/309; H04B 17/382; H04B 1/1027; H04B 1/109; H04B 1/12; H04B 1/715; H04B 15/00; H04B 17/328; H04B 17/327; H04B 7/0413; H04B 7/0632; H04B 7/06968; Y02D 30/70; Y02D 30/50; Y02D 10/00; Y02D 30/00; H04M 15/8038; H04M 1/72454; H04M 15/8033; H04M 2207/18; H04M 2242/30; H04M 15/49; H04M 1/72457; H04M 2215/32; H04M 2250/06; H04M 2215/34; H04M 3/2236; H04M 15/8016

See application file for complete search history.

(56) References Cited

U.S. PATENT DOCUMENTS

| | | | |
|---|---|---|---|
| 2015/0282206 A1* | 10/2015 | Kalhan | H04W 72/0446 370/330 |
| 2017/0064564 A1* | 3/2017 | Yun | H04B 17/345 |
| 2017/0171762 A1* | 6/2017 | Reis | H04W 72/51 |
| 2022/0295311 A1* | 9/2022 | Chuai | H04W 24/02 |

OTHER PUBLICATIONS

International Search Report dated Apr. 24, 2023 in Application No. PCT/US 22/53792.

* cited by examiner

VISUALIZING INTERFERENCE LEVEL IN WIRELESS NETWORK

CROSS REFERENCE TO RELATED APPLICATIONS

This application is a National Stage of International Application No. PCT/US2022/053792, filed Dec. 22, 2022, claiming priority to Indian Patent Application number 202221063674, filed Nov. 8, 2022.

FIELD OF INVENTION

The embodiments disclosed herein generally relates to communication network, and more particularly, for an electronic device and method for visualizing interference level in a wireless network.

BACKGROUND OF THE INVENTION

In general, a cellular wireless communication system includes a number of access nodes that are configured to provide cells defining wireless coverage areas for operating User Equipments (UEs). Each access node is coupled with a core network that provides connectivity with various application servers and transparent networks. With continuous enrichment of wireless service types, an increasingly high requirement on a transmission rate of a service is imposed and a capacity of a wireless network needs to be expanded gradually to meet the increasingly high requirement. To increase the capacity of the wireless network, wireless network miniaturization and densification are ensured. However, such miniaturized and dense wireless network has characteristics such as a large quantity of access points, high site density, high user fluidity, and strong mobility. Therefore, as a consequence of large access points, high site density, high user fluidity and strong mobility, interference of the wireless network also increases and is highly dynamic.

Some of methods to carry out interference detection is by sampling and accuracy testing of performance of the wireless network. One of optimization of the interference process is to determine a Radio Frequency (RF) optimization using predication tools. The prediction tools determine Reference Signal Received Power (RSRP) and Signal to Noise Ratio (SINR) information for the respective geography and prediction takes couples of weeks sometime for the entire level of prediction. The prediction accuracy is not in synchronization with inventory most of the time. Even after getting huge output files from the prediction tools, processing and analysing are difficult tasks for a RF engineer. In general, manual analyses of the RF engineer requires lot of man-hours to achieve accuracy of outcome.

For a user selecting a wireless access point based on a signal strength, strong interference causes interruption of a service of the user, and highly dynamic interference causes interruption of the service of the user and unbalances a load of the wireless access point, thereby affecting the service quality and user experience. Therefore, there is a need to enable optimization to improve network Key Performance Indicator (KPI) and user experience.

Thus, it is desired to address the above mentioned disadvantages or other shortcomings or at least provide a useful alternative.

OBJECT OF INVENTION

A principal objective of the invention is to accurately geo-locate an area of interference using actual user measurements such as geo-location information to pinpoint the interference area instead of relying on a prediction tool's output to determine accurate location of interference in the area.

SUMMARY

Embodiments disclosed herein provides an electronic device for visualizing interference level in a wireless network. The electronic device includes receiving Key Performance Indicators (KPIs) from each User Equipment (UE) of a plurality of UEs in the wireless network and geo-location information of each UE of the plurality of UEs. The electronic device further includes determining an interference level in a plurality of geographic areas based on the plurality of KPIs received from each UE of the plurality of UEs and the geo-location information of each UE of the plurality of UEs. The plurality of polygons are created based on the interference level in plurality of geographic areas. The interference level are determined based on the plurality of KPIs received from the UE. Further, the plurality of polygons are stored for visualization on a geographical map.

Embodiments disclosed herein provides a method for visualizing interference level in the wireless network. The method includes receiving KPIs from each UE of the plurality of UEs in the wireless network and geo-location information of each UE of the plurality of UEs. The method further includes determining the interference level in the plurality of geographic areas based on the plurality of KPIs received from each UE of the plurality of UEs and the geo-location information of each UE of the plurality of UEs. The plurality of polygons are created based on the interference level in plurality of geographic areas. The interference level are determined based on the plurality of KPIs received from the UE. Further, the plurality of polygons are stored for visualization on the geographical map.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Embodiments disclosed herein provides visualization of interference level in a wireless network. KPIs and geo-location information are received from each UEs in wireless network for a geographic area. An interference level is determined for geographic areas based on the KPIs received from the UEs and the geo-location information of the UEs. Based on the interference level polygons are created in geographic areas. The interference level is based on the KPIs and the geo-location information received from UEs. Further, the polygons are stored for visualization on a geographical map.

Embodiments disclosed herein provides a method for visualizing interference level in the wireless network. The method includes receiving KPIs from each UE of the plurality of UEs in the wireless network and geo-location information of each UE of the plurality of UEs. The method further includes determining the interference level in the plurality of geographic areas based on the plurality of KPIs received from each UE of the plurality of UEs and the geo-location information of each UE of the plurality of UEs. The plurality of polygons are created based on the interference level in plurality of geographic areas. The interference level are determined based on the plurality of KPIs received from the UE. Further, the plurality of polygons are stored for visualization on the geographical map.

The conventional system determines a current location of the UE to an interference location based on one of location database including information associated with one or more locations experiencing interference in a network service. The interference can be due to the frequency of one or more New Radio (NR) network procedures, the location database stored in the UE and network node, historic measurement data associated with determined current location, historic measurement data associated with determined current location. Unlike the conventional system, the present disclosure determines level of interference of the geographic area based on the KPIs and the geo-location information of the UEs to visualize on the geographical area.

The conventional systems include Base Station Identifiers (BSID) to a base station that is identified as interference source. The base stations send BSIDs ordered in scan reports based on interference level (based on highest received power first, lowest received power last). The BSID identified in the scan report identifies predominant interference source that can be used by a scheduler in identifying common interference sources. The BSID is also responsible for assigning a common group ID to some of mobile stations. However, the conventional systems does not disclose geo-locating the area of interference based on pre-defined KPI criteria and segregating the KPIs samples based on threshold criteria for different clutter or type of area.

In some embodiments of the conventional systems, an interference detection method includes receiving RSRP and SINR. The mass parameters of the RSRP and mass parameters of the SINR of each user terminal are determined. The interference existing in a system when the number of user terminals meet a condition that the mass parameters of the RSRP of the user terminals do not correspond to the mass parameters of the SINR of the user terminals in a certain area is larger than a preset threshold value. Unlike the conventional system, in the present disclosure the RSRP and SINR samples of the KPIs and geo-locations of the UEs are segregated based on the threshold criteria for different clutter or types of areas. Also, the conventional system does not disclose the grids that are grouped to form the interference polygons.

Referring now to the drawings, where similar reference characters denote corresponding features consistently throughout the figures, there are shown preferred embodiments.

Figure 1:
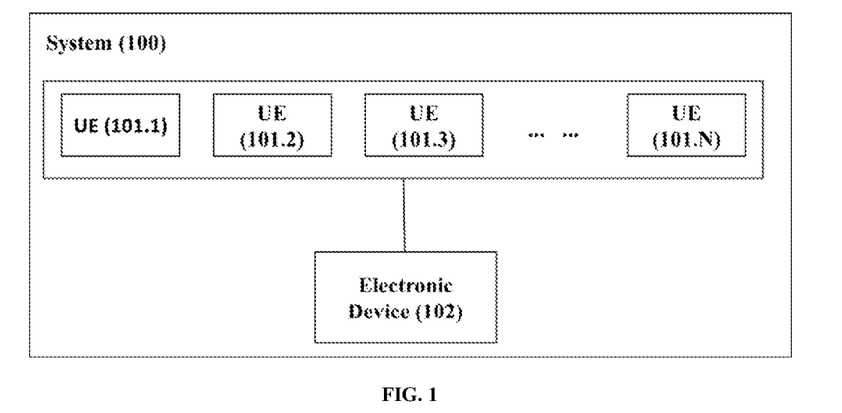
FIG. 1 is an overview of a system including an User Equipment (UE) and an electronic device for visualizing interference level in a wireless network, according to embodiments disclosed herein.

FIG. 1 is an overview of a system (100) including UEs (101.1-N) and an electronic device (102) for visualizing interference level in a wireless network, according to embodiments disclosed herein.

Although the FIG. 1 shows the hardware elements of the system (100) but it is to be understood that other embodiments are not limited thereon. In other embodiments, the system (100) may include less or more number of elements. Further, the labels or names of the elements are used only for illustrative purpose and does not limit the scope of the invention. One or more components can be combined together to perform same or substantially similar function.

In an embodiment, the system (100) includes UEs (101.1-101.N) and the electronic device (102) connected wirelessly or through a physical connection.

In an embodiment, the UEs (101.1-101.N) can be, for example, but not limited to a laptop, a desktop computer, a notebook, a relay device, a Device-to-Device (D2D) device, a smartphone, a tablet, an immersive device, a connected car, a television with communication facility, Internet of Things (IoT) device. The UEs (101.1-101.N) can be one or can be multiple UEs (101.1-101.N). The multiple UEs (101) can be connected together. The multiple UEs (101.1-101.N) are intern connected to the electronic device (102). The UEs (101.1-101.N) are configured to transmit the plurality of KPIs and geo-location information. The geo-location information can be for example, but not limited to longitude, latitude, location information of the user, type of area such as rural, urban, coordinates and the like. The UEs (101.1-101.N) send KPI information and geo-location information to the electronic device (101.1-101.N). The KPI information is received from Application Programming Interface (API). The API provides Radio Frequency (RF) KPIs such as Reference Signal Received Power (RSRP) and Signal to Noise Ratio (SINR). The UE sends the geo-location information using Global Positioning System (GPS) that makes data more useful in terms of location accuracy as well as KPI captured respectively.

In an embodiment, the electronic device (102) may be but not limited to a laptop, a palmtop, a desktop, a mobile phone, a smart phone, Personal Digital Assistant (PDA), a tablet, a wearable device, an Internet of Things (IoT) device, a virtual reality device, a foldable device, a flexible device, a display device and an immersive system. The electronic device connected to UE (101.1-N) for receiving the plurality of KPIs. The KPIs received from the UEs (101.1-N) are used for determining the interference level of the geographical area. The geographical areas can be for example but not limited to an area covering all or part of the territory, small as a park or a neighborhood.

Figure 2:
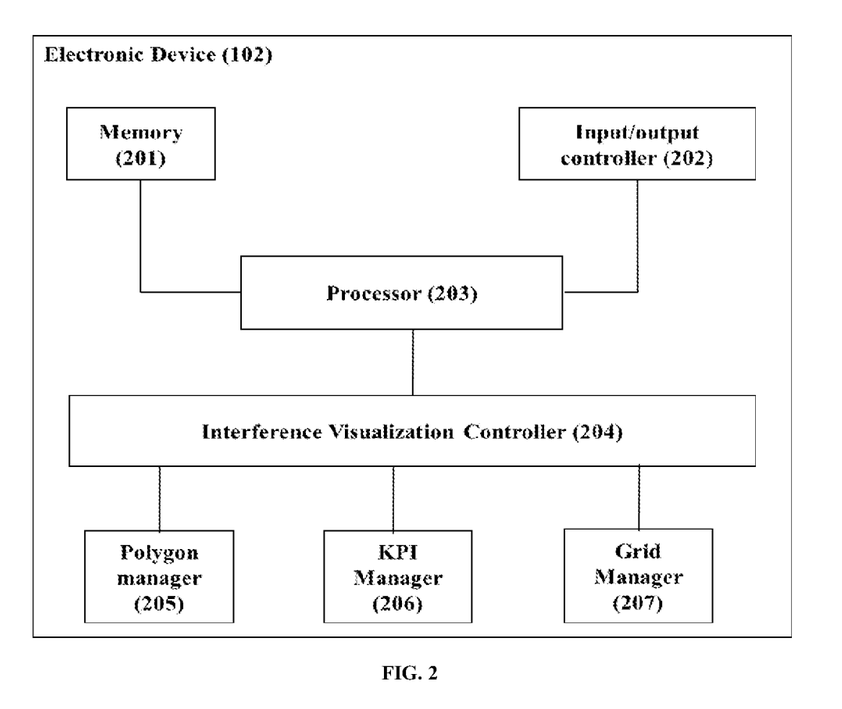
FIG. 2 is a block diagram of the electronic device for determining interference level in the wireless network, according to the embodiments herein.

FIG. 2 is a block diagram of the electronic device (102) for determining interference level in the wireless network, according to the embodiments herein.

In an embodiment, the electronic device (102) includes a memory (201), an Input/output controller (202), a processor (203), and an interference visualization controller (204). The interference visualization controller (204) is connected to a polygon manager (205), a KPI manager (206) and a grid manager (207). In an embodiment, the different modules such as the interference visualization controller (204) is connected to a polygon manager (205), a KPI manager (206) and a grid manager (207) can be processors or can be controlled by the processors.

In an embodiment, the electronic device (102) may be but not limited to a laptop, a palmtop, a desktop, a mobile phone, a smart phone, Personal Digital Assistant (PDA), a tablet, a wearable device, an Internet of Things (IoT) device, a virtual reality device, a foldable device, a flexible device, a display device and an immersive system. The electronic device (102) is configured to receive the plurality of KPIs. The KPIs received from the UEs (101) are used for determining the interference level of the geographical area.

The memory (201) is configured to store information about the KPI and the geo-location information. The memory (201) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (202) may, in some examples, be considered a non-transitory storage medium. The term "non-transitory" may indicate that the storage medium is not embodied in a carrier wave or a propagated signal. However, the term "non-transitory" should not be interpreted that the memory (201) is non-movable. In some examples, the memory (201) is configured to store larger amounts of information. In certain examples, a non-transitory storage medium may store data that can, over time, change (e.g., in Random Access Memory (RAM) or cache). The KPI information received from the UEs (101) can be one or plurality of parameters such as RSRP and SINR are stored in the memory (201).

In an embodiment, the Input/output controller (202) includes an electronic circuit specific to a standard that enables wired or wireless communication. The Input/output controller (202) is configured for communicating internally between internal hardware components and with external devices via one or more networks. The Input/output controller (202) is configured to transmit or receive the various signals. The signals can be but not limited to digital, analog signals. The inputs are received from the user to display the geographical map. Highlighted geographical areas are provided as outputs for the inputs given to the Input/output controller (202).

In an embodiment, the processor (203) may include one or a plurality of processors. The one or the plurality of processors (203) may be a general-purpose processor, such as a Central Processing Unit (CPU), an Application Processor (AP), or the like, a graphics-only processing unit such as a Graphics Processing Unit (GPU), a Visual Processing Unit (VPU), and/or an AI-dedicated processor such as a Neural Processing Unit (NPU). The processor (203) may include multiple cores and is configured to execute the instructions stored in the memory (201). The processor (203) is configured to execute instructions stored in the memory (201) and to perform various processes.

In an embodiment, the processor (203) is in communication with interference visualization controller (204) that is used to receive the KPIs and geo-location information from the UEs (101). The wireless network can be, for example, but not limited to a $5^{th}$ Generation (5G) network, a $6^{th}$ Generation (6G) network and an Open Radio Access Network (O-RAN 5) network. The interference visualization controller (205) is configured to determine an interference level in the geographic areas based on the KPIs received from UEs (101) and the geo-location information of the UEs (101)

In an embodiment, the polygon manager (205) is configured to create polygons based on the interference level in the geographical areas. The polygons can be created of any shape using the grids created. The grids are created based on the KPIs and geo-location information received from the UEs (101). Once the interference level is determined, the polygons are created and stored in visualization on the geographical map based on the interference level.

In an embodiment, the KPI manager (206) stores the information related to the KPIs. The KPIs include the RSRP and SINR. The interference criteria is determined based on the KPI criteria corresponding to each KPI and based on the type of areas available in the geographical area or sub-area. The type of areas can be but not limited to Dense Urban (DU), Urban (U), Sub Urban (SU) and Rural (RU). The RSRP is the measurement of the received power level in a Long Term Evolution (LTE) cell network. An average power is a measurement of the power received from a single reference signal. The RSRP is the average power received from a single reference signal, and the typical range of RSRP is around −44 dbm (good) to −140 dbm (bad).

In an embodiment, the grid manager (207) segregates the geographical areas into grids based on the KPIs and the type of areas. The grids are created based on a set of KPIs of the corresponding areas in the geographical map. The grids are divided as polygons based on the interference level and highlighted with different indicators to differentiate with non-interferential areas. The non-interferential areas can be highlighted with a different color or left uncolored.

Figure 3:
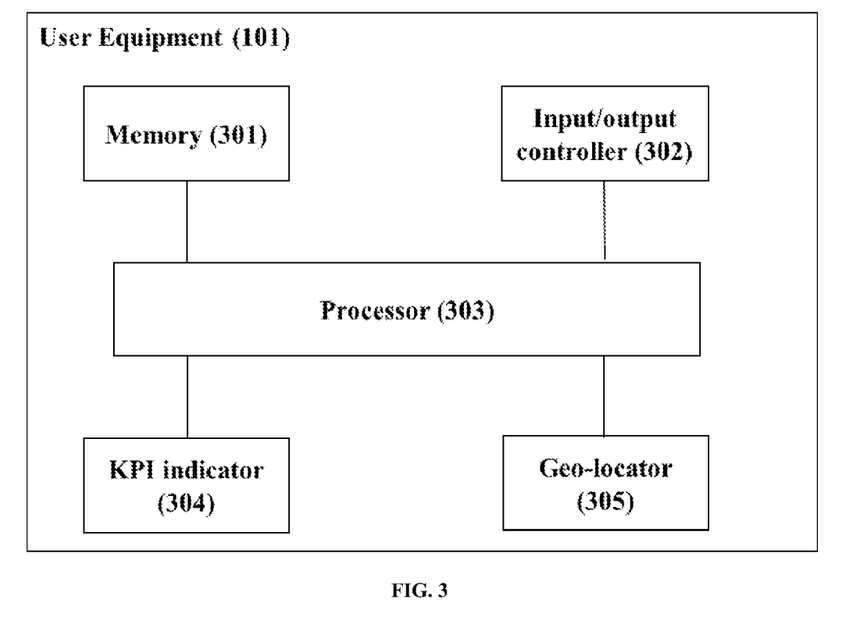
FIG. 3 is a block diagram of the UE for visualization of interference at different geographical locations, according to the embodiments disclosed herein.

FIG. 3 is a block diagram of the UE (101) for visualization of interference at different geographical locations, according to the embodiments disclosed herein. Further, the labels or names of the components are used only for illustrative purpose and does not limit the scope of the invention. One or more components can be combined together to perform same or substantially similar function in the UE (101).

In an embodiment, the UE (101) includes the processor (303) communicatively coupled to the memory (301), the input/output controller (302), the KPI indicator (304) and the geo-locator (305). The processor (303) may include one or a plurality of processors. The one or the plurality of processors (303) may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (302) may include multiple cores and is configured to execute the instructions stored in the memory (301). The processor (302) is configured to execute instructions stored in the memory (301) and to perform various processes.

In an embodiment, the processor (303) is configured to transmit the KPIs and the geo-location information to the electronic device (102). The KPIs include parameters for example RSRP and SINR. The geo-location information are shared along with the KPIs. The geo-location information is shared using the GPS system.

In an embodiment the memory (301) stores information about the KPI and the geo-location information. The memory (301) also stores instructions to be executed by the processor (303). The memory (301) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (301) may, in some examples, be considered anon-transitory storage medium. The term "non-transitory" may indicate that the storage medium is not embodied in a carrier wave or a propagated signal. However, the term "non-transitory" should not be interpreted that the memory (301) is non-movable. In certain examples, a non-transitory storage medium may store data that can, over time, change (e.g., in Random Access Memory (RAM) or cache).

In an embodiment, the input/output controller (302) includes an electronic circuit specific to a standard that enables wired or wireless communication. The input/output controller (302) is configured to communicate internally between internal hardware components of the electronic device (102) and with external devices via one or more networks. The Input/output controller (302) is configured for communicating internally between internal hardware components and with external devices via one or more networks.

In an embodiment, the KPI indicator (304) is configured to provide the information about RSRP and SINR. The UE (101) measures the KPIs and determines geo-location information precisely using the geo-locator (305).

In an embodiment, the geo-locator (305) is configured to share the geo-location information about the geographical areas, type of areas using the GPS system.

The UE (102) is configured to transmit the KPIs and geo-location information. The geo-location information can be received using GPS of android Application Programming Interface (API) of UE. A GPS receiver is an L-band radio processor capable of solving the navigation equations in order to determine the user position, velocity and precise time (PVT), by processing the signal broadcasted by GPS satellites. Therefore, the GPS accurately transmits accurate location of the UEs (102) for determining the area of interference in particular geographical area.

Figure 4A:
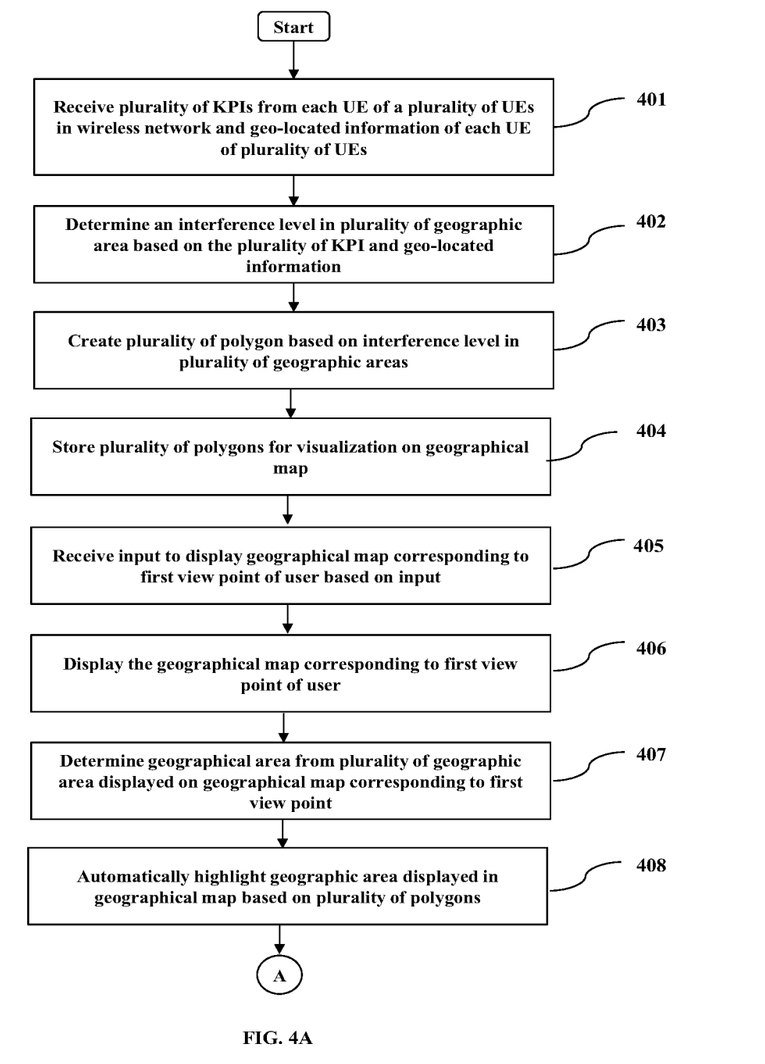
FIG. 4A is a flow chart illustrating a method for visualizing interference level in the wireless network, according to the embodiments as disclosed herein.

FIG. 4A is a flow chart for a method for visualizing interference level in a wireless network, according to the embodiments as disclosed herein. At step 401, the KPIs and geo-location information are received from the UEs (102). The KPIs can include RSRP and SINR. The KPI data provide candidate information required for effective network planning, performance analysis and optimization. The geo-location information is determined based on the type of areas available in the geographical area and the detected types of area are segregated into the grids. The geo-location information is determined based on the interference criteria. The interference criteria can be determined based on the types of area such as Dense Urban (DU), Urban (U), Sub Urban (SU) and Rural (RU).

At step 402, the interference level in the geographic areas are determined based on the KPIs received from the UEs (102) and the geo-location information of the UEs (102). Based on the geographic areas the area of interference can be calculated precisely without any manual interaction as in the existed systems. The geo-locations are divided into clutters or type of areas. For instance, if the KPI including RSRP is greater than 90 and SINR is less than 1.5 or if the RSRP is greater than 95 and SINR is less than −2, then the geo-location area is marked as dense urban or DU. For another instance, if the RSRP is greater than −92 and SINR is less than 1.5 or RSRP is greater than 98 and SINR is less than −2, then the particular geo-location area is marked as urban.

At step 403, using the interference level in the geographic areas polygons are created based on the KPIs received from the UEs (102) and the geo-location information of the UEs (102). The interference level is determined based on KPIs that meet the interference criteria. The interference criteria includes KPI criteria corresponding to KPIs based on the type of the areas available in the sub-area of the geographical area. The grids are created based on the KPIs and the type of areas. The grids can include only one grid or plurality of grids based on the geo-location area.

At step 404, the polygons are stored for visualization on the geographical map. The polygons are created by grouping the set of grids from the grids. The polygons can be of any shape based on the type of area of the grids including the UEs (101). The polygons are created based on the interference level in the grids. For instance, if the KPI including RSRP is greater than 90 and SINR is less than 1.5 or if the RSRP is greater than 95 and SINR is less than −2, then the geo-location area is marked as dense urban or DU.

In an embodiment, the polygons can include only one polygon or can include plurality of polygons. The interference polygons are created based on pre-defined RSRP and SINR threshold using crowd source data points. The crowd source data points are the target geographical area for which the interference level are determined. The source data points can be inside any of the areas such as DU, U and the like.

At step 405, the input is received from the user to display geographical map on the first view point of the user based on the input. The inputs can be received from the UEs (101) using User Interface (UI). The inputs are provided by the user for visualizing the maps on the geographical area. The inputs can be details regarding the interference level in particular areas, or interference change in the areas.

At step 406, the geographical area is highlighted automatically and displayed on the geographical map based on polygons. The geographical map can be for instance General Reference, Topographic Maps, Thematic, Navigation Charts and the like.

At step 407, the geographical area is determined from the geographic area displayed on geographic map corresponding to the first view point. The first view point can be the user viewing User Interface (UI) or display screen. The viewing point can be altered based on the user input and requirements.

At step 408, the geographical areas are highlighted on the display based on the polygons. The polygons are created based on the interference level determined from the KPI criteria. The KPI criteria is determined based on the geographical areas available in the geographical area. The polygon creation is performed by detecting the type of areas available in the geographic area. The geographic areas are segregated into the grids based on the KPIs and the type of areas. In each polygons a set of KPIs are detected that meets the interference criteria. Once the interference criteria is met then the polygons are created by grouping the set of grids. The polygons are grouped as another set for the interference criteria that does not meet threshold.

Figure 4B:
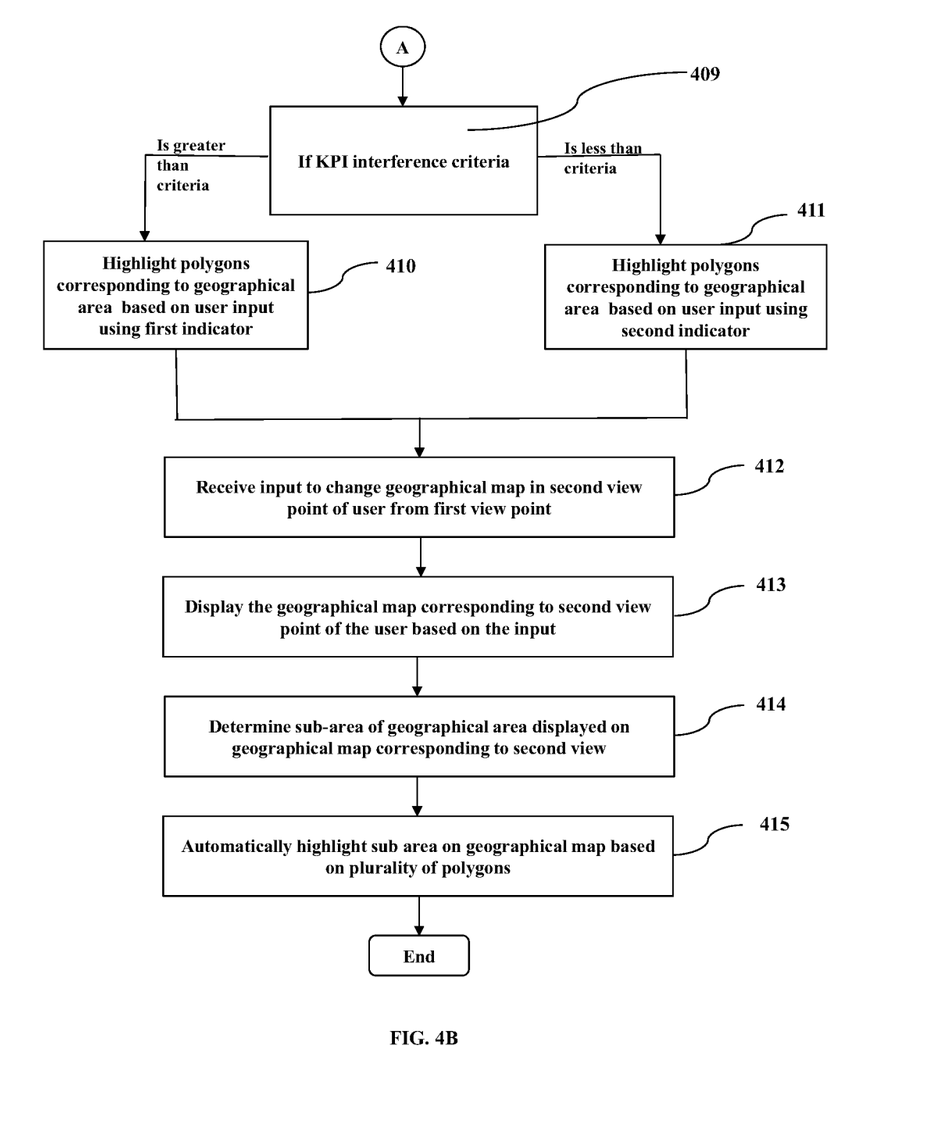
FIG. 4B is a continuation of a flow chart illustrating the method for visualizing interference level in the wireless network, according to the embodiments as disclosed herein.

FIG. 4B is the flow chart continuation for the method for visualizing interference level in the wireless network, according to the embodiments as disclosed herein. At step 409, if the KPIs meet interference criteria then the polygons corresponding to the geographical area based on the user input are highlighted using a first indicator as specified at step (410). The first and the second indicators can be of any colors or can be highlighted with no colors.

At step 410, if the KPI does not meet interference criteria then the polygons are highlighted corresponding to the geographical area based on the user input using the second indicator. The first and the second indicators can be of any colors or can be highlighted with no colors.

At step 411, the input is received to change the geographical map in the second view point of the user from the first view point and the geographical map corresponding to the first view point of the user is displayed.

At step 412, the second view point is displayed based on the received user input. The second view point can be a particular zoomed in area or the zoomed out area as per the user request. The viewpoints can be of any numbers according to the user input and the display screen displays the targeted area of the user's choice.

At step 414, the sub-area of the geographical area is displayed in the geographical map based on the polygons by highlighting automatically. The geographical area is determined based on the geo-location information of the UEs (102). The sub-area of the geographical area is displayed on the geographical map corresponding to the first view point of the user.

In an embodiment, a unique identifier is allocated to each polygon of the polygons to store the interference polygon layer for RF optimization. The interference criteria includes KPI criteria corresponding to KPI of the KPIs based on the type of areas available in the geographical area. The interference criteria includes KPI criteria corresponding to each KPI of the KPIs based on type of areas available in the sub-area of the geographical area.

At step 415, the input to display the geographical map is received in the first view point of the user. The geographical map corresponding to the first view point of the user is displayed based on the input. The geographical area from the geographical areas is displayed on the geographical map corresponding to the first view point of the user to automatically highlight the geographical area based on the polygons.

In another embodiment of the present disclosure, automatically highlighting the sub-area of the geographical area displayed in the geographical map based on the polygons for each of the one detected KPI that meets the interference criteria to display the geographical map. For each of the detected KPI that does not meet the interference criteria, displaying the geographical map by highlighting the polygons from the polygons corresponding to the sub-area of the geographical area using the second indicator. The indicators can be but not limited to any colors such as green, red, yellow and the like.

Figure 5:
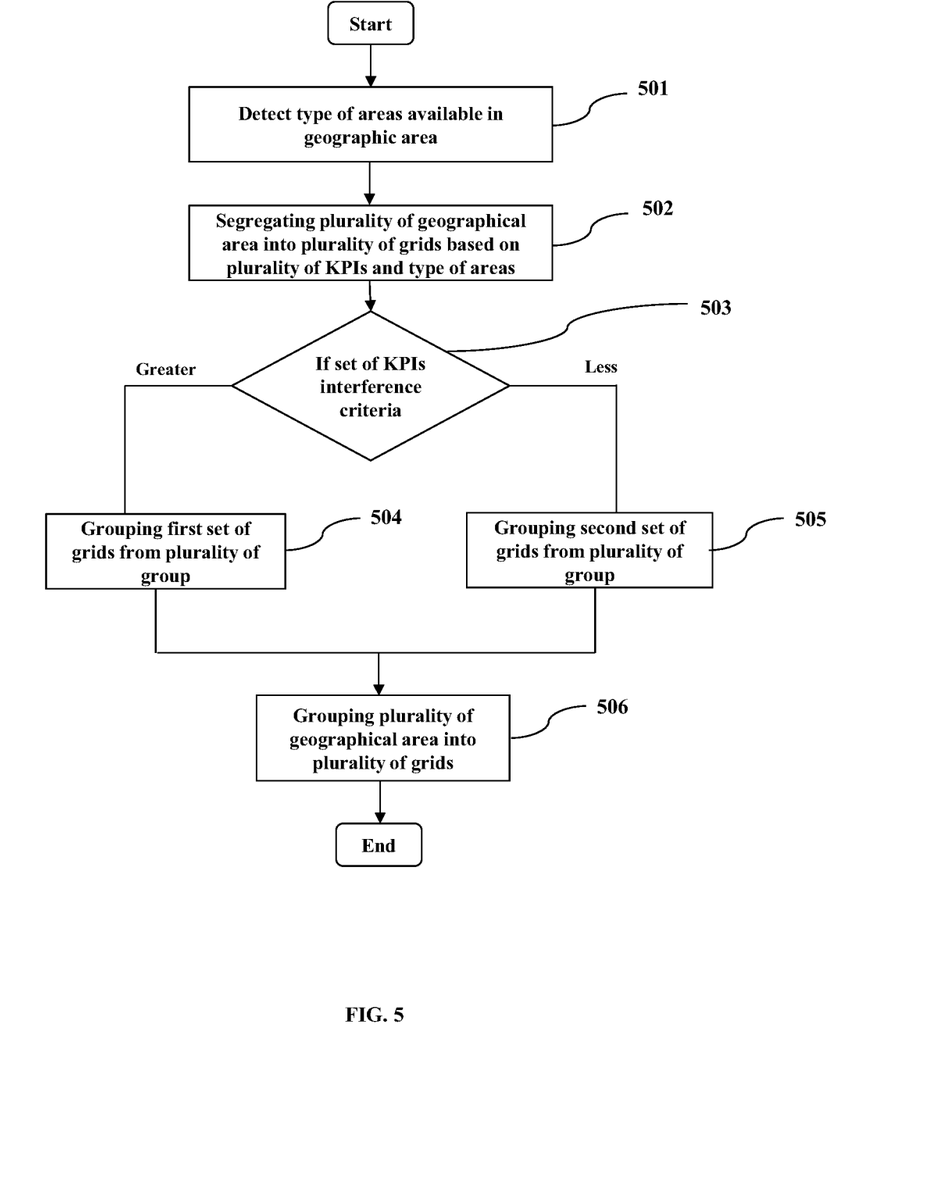
FIG. 5 is a flow diagram illustrating a method of creation of a plurality of polygons, according to the embodiments as disclosed in herein.

FIG. 5 is a flow diagram for a method of creation of polygons, according to the embodiments as disclosed in herein.

At step 501, the polygons are created by detecting the type of areas available in the geographical area. The type of areas can be Dense Urban (DU), Urban (U), Sub Urban (SU) and Rural (RU). The type of areas can be selected based on the mentioned four areas and divided into polygons.

At step 502, the geographical area are segregated into grids based on the KPIs and the type of areas. The type is detected in each polygon based on the set of KPIs that meets the interference criteria.

At step 503, the KPI interference criteria are determined and if the KPI criteria is met then grids are grouped as first set of grids at step 504. The KPI criteria corresponding to the plurality of KPIs based on the type of areas or sub-areas available in the geographical area. The plurality of KPIs comprises RSRP and SINR.

At step 505, if the interference criteria does not meet then the grids are grouped into second set. The KPI interference criteria has been provide with the thresholds according to the type of area of the interference in the geographical map in Table. 1.

TABLE 1

| Clutter Type | Interference Criteria |
| --- | --- |
| DU | (RSRP >= 90) AND (SINR < 1.5) OR (RSRP >= 95) AND (SINR <= 2) |
| U | (RSRP >= 92) AND (SINR < 1.5) OR (RSRP >= 96) AND (SINR <= 2) |
| SU | (RSRP >= 94) AND (SINR < 1.5) OR (RSRP >= 98) AND (SINR <= 2) |
| RU | (RSRP >= 98) AND (SINR < 1.5) OR (RSRP >= 101) AND (SINR <= 2) |

At step 506, the polygons are created based on the interference criteria. The set of grids are grouped based on the predefined distance. The polygons are highlighted based on the geographical area displayed in the geographical map. The polygons are highlighted based on the different indicators. The indicators can be the first indicator and the second indicator. The first indicator includes different colours can be any primary colours or secondary colours for example red, green, yellow and the like. The first indicator includes colours for example primary colours or secondary colours the primary colours can be red, blue, yellow and the like. The secondary colours can be green, orange, and purple and the like.

Figure 6:
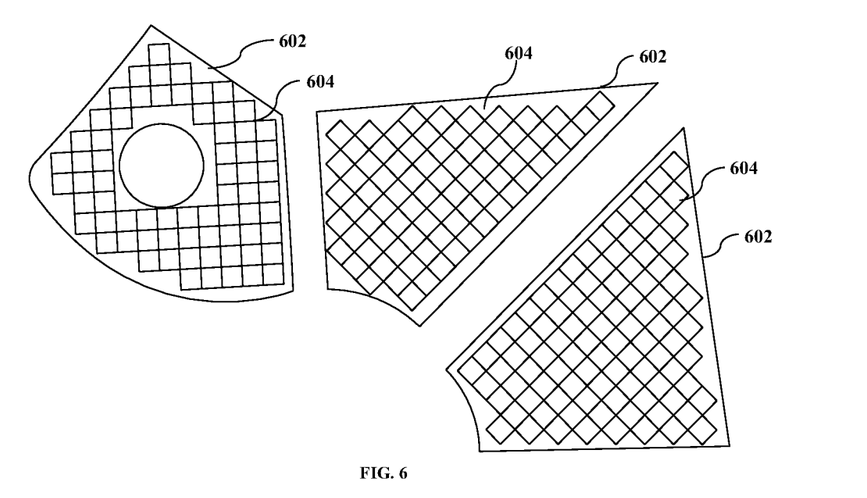
FIG. 6 is a schematic view of interference polygons created for visualizing interference level, according to the embodiments as disclosed in herein.

FIG. 6 is a schematic view illustrating an interference polygon creation for visualizing interference level, according to the embodiments as disclosed in herein. Referring to FIG. 6, the creation of polygons (602) include receiving the KPIs from the UEs (101). The KPIs include pre-defined RSRP and SINR. The RSRP of high threshold and the SINR of low threshold are collected from the crowd data points. The received KPIs are segregated as per the criteria defined for the method and are mapped to 50*50 m grids (604) as shown in FIG. 6. The grids (604) qualified for the interference area demarcation are flagged with the first indicator. The grids (604) that are not qualifying the interference criteria are indicated with the second indicator. The first indicator is used for indicating the formation of interference polygons (602) using the group of grids (604). The grids include an extrapolation zone range of 100 m to exclude small patches of the grids (604) rather than bigger polygon with the neighbor grids. The grids (604) are created based on the interference criteria of the KPI and the geo-location information received from the UE (102). The grids (604) are created and converted to group of polygons (602) based on the interference level.

Embodiments disclosed herein provides visualization of interference level in a wireless network. KPIs and geo-location information are received from each UEs in wireless network for a geographic area. An interference level is determined for geographic areas based on the KPIs received from the UEs and the geo-location information of the UEs. Based on the interference level polygons are created in geographic areas. The interference level is based on the KPIs and the geo-location information received from UEs. Further, the polygons are stored for visualization on a geographical map.

In some embodiment of the present disclosure, creating a set of all KPIs using RSRP and SINR includes segregating the KPIs based on the threshold criteria as mentioned for different types of areas. The separate set for KPIs with high RSRP and low SINR are made. The KPIs are converted into 50*50 m grids to be converted into polygons by grouping the grids considering the extrapolation zone of 100 m. Assigning a unique polygon ID to each polygon so each polygon can be tracked individually. The polygon layers are saved and visualized over map layer for further analysis and optimization by RF team.

The clutter type or area type can be but not limited to DU, U, SU and RU. The interference criteria can be set based on the types of the area. For example, (RSRP>-90) AND (SINR<1.5) OR (RSRP>-95) AND (SINR<-2) is for DU, (RSRP>-92) AND (SINR<1.5) OR (RSRP>-96) AND (SINR<-2), (RSRP>-94) AND (SINR<1.5) OR (RSRP>-98) AND (SINR<-2) and (RSRP>-98) AND (SINR<1.5) OR (RSRP>-101) AND (SINR<-2) as described in Table 1.

Figure 7:
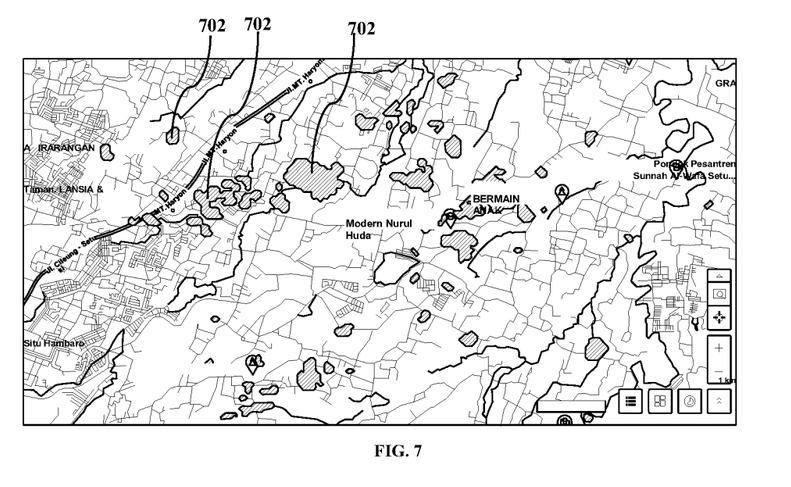
FIG. 7 is a representation of highlighted geographical area displayed on the geographical map based on interference level, according to the embodiments as disclosed in herein.

FIG. 7 is a pictorial representation of highlighted geographical area (702) displayed on the geographical map based on the interference level, according to the embodiments as disclosed in herein. FIG. 7 represents the geographical map highlighting the geographic area (702) that meets the interference criteria and based on the type of area. As shown in FIG. 7, some of the areas have been highlighted to show the high interference (702) and with some geographical area including no interference based on the interference criteria. The reference numeral shows few of the highlighted interference polygons. However, the map can comprise multiple polygons with high interference. The un-highlighted or represented with different color includes less or no interference in the geographical area. FIG. 7 shows an exemplary geographical map indicating interference level in the particular geographical area. The un-highlighted area in the geographical map indicates less or no interference level in the geographical area. The geographical map indicating the interference level can be indicated with any colors as indicators, highlighting the interference area in one color and the less or no interference area with different color.

The present disclosure, the interference visualization is performed by receiving the KPIs from the UEs in the wireless network and the geo-location information of the UEs. The interference level is determined in the geographic areas based on the KPIs and the geo-location information. The plurality of polygons are created based on the interference level in plurality of geographic areas. The interference level are determined based on the plurality of KPIs received from the UE. Further, the plurality of polygons are stored for visualization on a geographical map. The geo-location information of UEs can accurately determine the interference areas in the geographic map. The present disclosure is cost saving as there is no need to send engineers on field for preliminary analysis or identification of areas impacted with high interference. Therefore, the manual analysis is reduced and the process is automated to determine the interference level with accuracy.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

I claim:

1. An electronic device for visualizing interference level in a wireless network, wherein the electronic device comprises:
a memory;
a processor, communicatively coupled to the memory, configured to:
receive a plurality of Key performance Indicator (KPIs) from each User Equipment (UE) of a plurality of UEs in the wireless network and geo-location information of each UE of the plurality of UEs;
determine an interference level in a plurality of geographic areas based on the plurality of KPIs received from each UE of the plurality of UEs and the geo-location information of each UE of the plurality of UEs;
create a plurality of polygons based on the interference level in the plurality of geographic areas, the plurality of KPIs received from each UE of the plurality of UEs, and the geo-location information of each UE of the plurality of UEs; and
store the plurality of polygons for visualization on a geographical map;
receive an input to display the geographical map in a first view point of a user;
output, for display, the geographical map corresponding to the first view point of the user based on the input;
determine a geographical area from the plurality of geographic areas displayed on the geographical map corresponding to the first view point of the user;
retrieve the interference level corresponding to the geographical area displayed in the geographical map from the memory; and
automatically highlight the geographical area displayed in the geographical map based on the plurality of polygons,
wherein automatically highlighting, by the electronic device, the geographical area displayed in the geographical map based on the plurality of polygons comprises:
for each of the at least one detected KPI that meets an interference criteria, displaying the geographical map by highlighting the polygons from the plurality of polygons corresponding to the geographical area using a first indicator to distinguish the polygons for which the at least one detected KPI meets the interference criteria, wherein the interference criteria comprises KPI criteria corresponding to each KPI of the plurality of KPIs based on type of areas available in the geographical area.

2. The electronic device as claimed in claim 1, wherein the processor is configured to:
receive an input to change the geographical map in a second view point of the user from the first view point;
display the geographical map corresponding to the second view point of the user based on the input;
determine a sub-area of the geographical area displayed on the geographical map corresponding to the second view point of the user; and
automatically highlight the sub-area of the geographical area displayed in the geographical map based on the plurality of polygons.

3. The electronic device as claimed in claim 2, wherein automatically highlighting the sub-area of the geographical area displayed in the geographical map based on the plurality of polygons comprises:
for each of the at least one detected KPI that meets the interference criteria, displaying the geographical map by highlighting the polygons from the plurality of polygons corresponding to the sub-area of the geographical area using the first indicator; and
for each of the at least one detected KPI that does not meet the interference criteria, displaying the geographical map by highlighting the polygons from the plurality of polygons corresponding to the sub-area of the geographical area using a second indicator.

4. The electronic device as claimed in claim 1, wherein the processor is configured to determine the geographical area based on the geo-location information of each UE of the plurality of UEs.

5. The electronic device as claimed in claim 1, wherein the plurality of polygons creation comprises:
detect type of areas available in the geographical area;
segregate the plurality of geographical area into a plurality of grids based on the plurality of KPIs and the type of areas;
in each polygon of the plurality of polygons, detecting, by the electronic device, a set of KPIs of the plurality of KPIs that meets or does not meets the at least one-interference criteria;
for each of the at least one detected KPI that meets the interference criteria-to, create creating the plurality of polygons by grouping a set of grids from the plurality of grids, wherein the set of grids are grouped based on a predefined distance; and
for each of the at least one detected KPI that does not meet the interference criteria, creating, by the electronic device, the plurality of polygons by grouping a set of grids from the plurality of grids.

6. The electronic device as claimed in claim 1, wherein automatically highlighting, by the electronic device, the geographical area displayed in the geographical map based on the plurality of polygons further comprises:
for each of the at least one detected KPI that does not meets the interference criteria, displaying the geographical map by highlighting the polygons from the plurality of polygons corresponding to the geographical area using a second indicator.

7. The electronic device as claimed in claim 1, wherein the processor is configured to:
allocate a unique identifier to each polygon of the plurality of polygons;
store the interference polygon layer for RF Optimization.

8. The electronic device as claimed in claim 1, wherein the plurality of KPIs comprises a Reference Signal Received Power (RSRP) and a Signal to Noise Ratio (SINR).

9. A method for visualizing interference level in a wireless network, wherein the method comprises:
receiving, by an electronic device in the wireless network, a plurality of Key Performance Indicator (KPIs) from each User Equipment (UE) of a plurality of UEs in the wireless network and geo-location information of each UE of the plurality of UEs;
determining, by the electronic device, an interference level in a plurality of geographic areas based on the plurality of KPIs received from each UE of the plurality of UEs and the geo-location information of each UE of the plurality of UEs;

creating, by the electronic device, a plurality of polygons based on the interference level in the plurality of geographic areas based on the plurality of KPIs received from each UE of the plurality of UEs, and the geo-location information of each UE of the plurality of UEs;

storing, by the electronic device, the plurality of polygons for visualization on a geographical map;

receiving, by the electronic device, an input to display the geographical map in a first view point of a user;

outputting for display, by the electronic device, the geographical map corresponding to a first view point of the user based on the input;

determining, by the electronic device, a geographical area from the plurality of geographic areas displayed on the geographical map corresponding to the first view point of the user; and automatically highlighting, by the electronic device, the geographical area displayed in the geographical map based on the plurality of polygons, wherein automatically highlighting, by the electronic device, the geographical area displayed in the geographical map based on the plurality of polygons comprises:

for each of the at least one detected KPI that meets an interference criteria, displaying the geographical map by highlighting the polygons from the plurality of polygons corresponding to the geographical area using a first indicator to distinguish the polygons for which the at least one detected KPI meets the interference criteria, wherein the interference criteria comprises KPI criteria corresponding to each KPI of the plurality of KPIs based on type of areas available in the geographical area.

10. The method as claimed in claim 9, wherein the method comprises:

receiving, by the electronic device, an input to change the geographical map in a second view point of the user from the first view point;

displaying, by the electronic device, the geographical map corresponding to a first view point of the user based on the input;

determining, by the electronic device, a sub-area of the geographical area displayed on the geographical map corresponding to the first view point of the user; and automatically highlighting, by the electronic device, the sub-area of the geographical area displayed in the geographical map based on the plurality of polygons.

11. The method as claimed in claim 10, wherein automatically highlighting, by the electronic device, the sub-area of the geographical area displayed in the geographical map based on the plurality of polygons comprises:

for each of the at least one detected KPI that meets the interference criteria, displaying the geographical map by highlighting the polygons from the plurality of polygons corresponding to the sub-area of the geographical area using the first indicator; and for each of the at least one detected KPI that does not meet the interference criteria, displaying the geographical map by highlighting the polygons from the plurality of polygons corresponding to the sub-area of the geographical area using a second indicator.

12. The method as claimed in claim 9, wherein the method comprises determining, by the electronic device, the geographical area based on the geo-location information of each UE of the plurality of UEs.

13. The method as claimed in claim 9, wherein creating, by the electronic device, the plurality of polygons comprises:

detecting, by the electronic device, type of areas available in the geographical area;

segregating, by the electronic device, the plurality of geographical area into a plurality of grids based on the plurality of KPIs and the type of areas;

in each polygon of the plurality of polygons, detecting, by the electronic device (102), a set of KPIs of the plurality of KPIs that meets or does not meet the interference criteria;

for each of the at least one detected KPI that meets the interference criteria, creating, by the electronic device, the plurality of polygons by grouping a set of grids from the plurality of grids, wherein the set of grids are grouped based on a predefined distance; and for each of the at least one detected KPI that does not meet the interference criteria, creating, by the electronic device, the plurality of polygons by grouping a set of grids from the plurality of grids.

14. The method as claimed in claim 9, wherein automatically highlighting, by the electronic device, the geographical area displayed in the geographical map based on the plurality of polygons further comprises:

for each of the at least one detected KPI that does not meet the interference criteria, displaying the geographical map by highlighting the polygons from the plurality of polygons corresponding to the geographical area using a second indicator.

15. The method as claimed in claim 9, wherein the method comprises:

allocating, by the electronic device, a unique identifier to each polygon of the plurality of polygons;

storing, by the electronic device, the interference polygon layer for RF Optimization.

16. The method as claimed in claim 9, wherein the plurality of KPIs comprises a Reference Signal Received Power (RSRP) and a Signal to Noise Ratio (SINR).

* * * * *